United States Patent [19]

Deely

[11] 3,977,645
[45] Aug. 31, 1976

[54] UNIVERSALLY MOVABLE MIRROR WITH A UNIVERSAL MOUNTING CLAMP

[76] Inventor: Carroll Leo Deely, 9234 Rockbrook Drive, Dallas, Tex. 75220

[22] Filed: July 9, 1975

[21] Appl. No.: 594,520

[52] U.S. Cl. .............................. 248/484; 248/278
[51] Int. Cl.² ...................... F16C 11/06; B60R 1/04
[58] Field of Search .......... 248/479, 480, 481, 482, 248/484, 485, 486, 487, 278, 226 A

[56] References Cited
UNITED STATES PATENTS

| | | | |
|---|---|---|---|
| 454,553 | 6/1891 | Whitten | 248/226 A |
| 763,380 | 6/1904 | Eble et al. | 248/484 X |
| 1,063,220 | 6/1913 | Seamon | 248/485 X |
| 1,327,608 | 1/1920 | Barnard | 248/485 |
| 1,717,106 | 6/1929 | Holt | 248/278 UX |
| 2,651,725 | 9/1953 | McFarland | 248/278 X |
| 3,643,902 | 2/1972 | Gualano | 248/226 A |
| D159,100 | 6/1950 | Ryder | 248/226 A X |

*Primary Examiner*—J. Franklin Foss
*Attorney, Agent, or Firm*—Wayland D. Keith

[57] ABSTRACT

This invention relates to a portable mirror having demountable features to enable the mirror, having friction jointed mounting arms attached thereto, the arms and the mounting clamp to be disassembled for packing in a traveling bag or the like, which portable mirror may be readily reassembled without the use of tools. The mounting clamp may then be clamped on a ledge or other outwardly projecting member, on either the upper or lower side of a horizontal member, or on the side of an upright member. A stub shaft on the lower end of the lower mounting arm fits within a socket in journaled relation to allow 360° rotation of the mirror. The mirror is detachably mounted on the upper end of the uppermost arm in a ball and socket relation, so the mirror may be adjusted to any angle by the ball and socket arrangement and to any height within the length of the frictionally jointed arms. The frictionally jointed arms have the joints thereof of such tightness that they will remain in any fixed position until manually moved. The mounting clamp has five sockets therein to pivotally receive the stub shaft on the lower end of the lower arm in journaled relation for rotation about the axis thereof. The mirror may be so adjusted as to receive proper lighting for the best viewing and also it is so jointed that the opposite side of the head can be reflected into a second mirror when the jointed arms are properly positioned.

4 Claims, 10 Drawing Figures

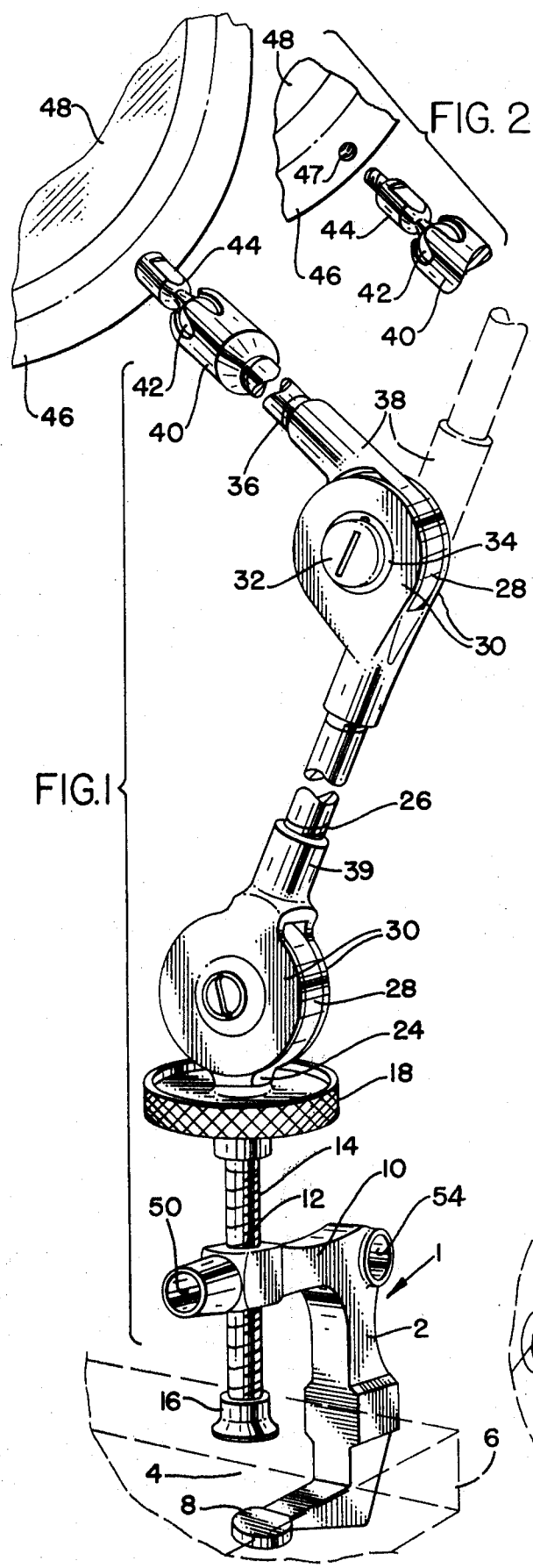
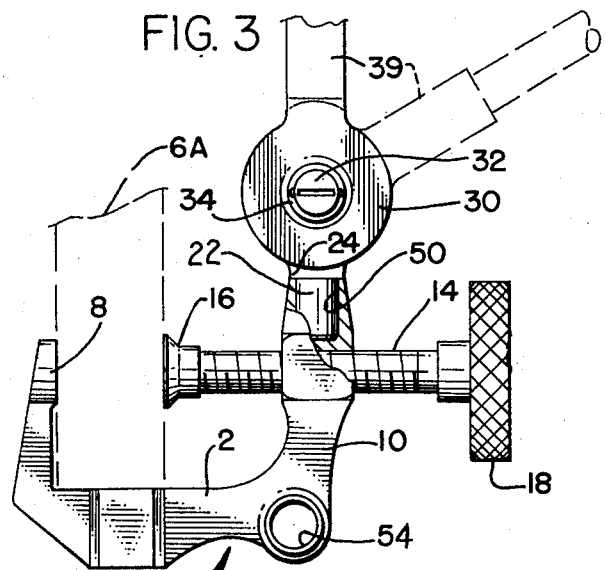
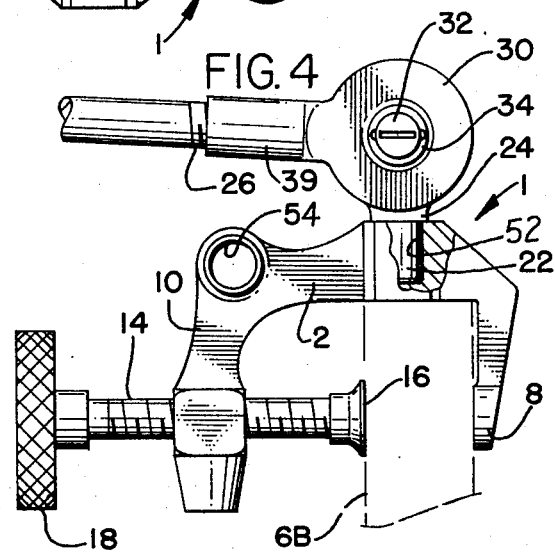
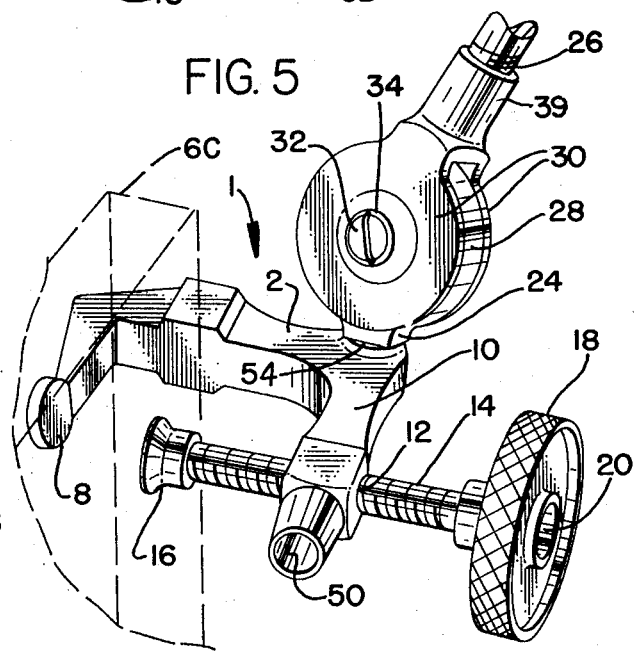

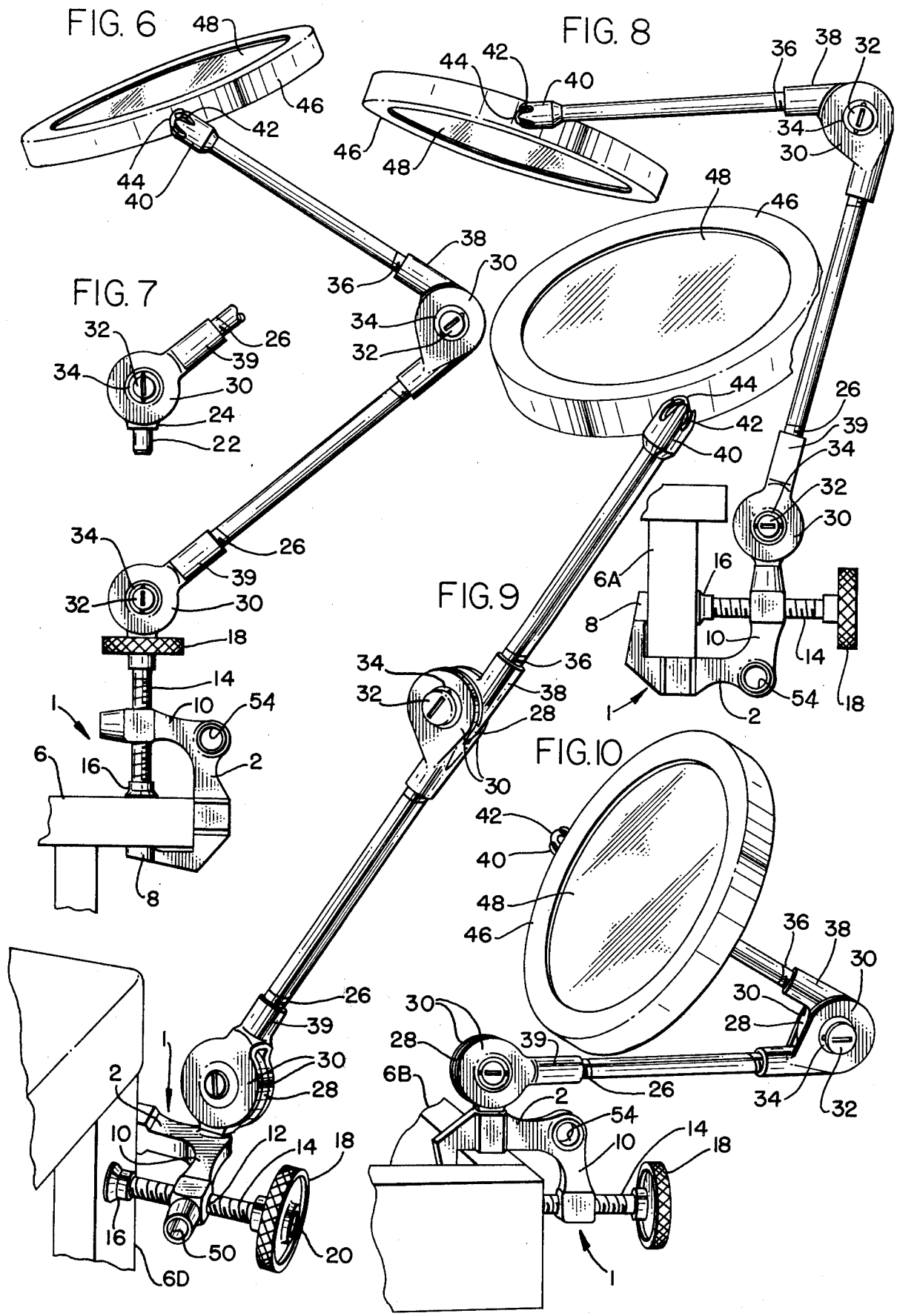

UNIVERSALLY MOVABLE MIRROR WITH A UNIVERSAL MOUNTING CLAMP

BACKGROUND OF THE INVENTION

The background of the invention will be set forth in two parts.

1. Field of the Invention

The present invention pertains generally to the field of adjustable travel mirrors and more particularly travel mirrors that may be readily disassembled and reassembled without the use of tools so as to present a mirror for ready access in motel and hotel rooms and other places as desired to use the mirror.

2. Description of Prior Art

Various travel mirrors have been proposed heretofore as well as various clamps therefor. However, none of the patents found as a result of a search in the United States Patent Office performs all of the movements and presents all of the advantages of the present invention.

OBJECTS OF THE INVENTION

An object of this invention is to provide a clamp for mounting a mirror which clamp may be attached to a ledge whether horizontal, angular or vertical thereby enabling a hingeable mounting arm with a mirror attached thereto to be pivotally mounted thereon to revolve 360° about an axis.

Another object of this invention is to provide a universal mounting clamp for a mirror, which clamp has recesses therein to receive a pivot shaft of a mirror arm for positioning the stub shaft in any one of at least five recesses, so regardless of the manner in which the clamp is clamped to a ledge or other member, one or more of the recesses will be capable of receiving the stub shaft therein in journaled relation so that the pivot arm positioned in a selected recess in the mounting clamp may swing freely about the axis of the stub shaft.

Still another object of the invention is to provide a mounting arm having a plurality of friction bearing joints, which joints may be tightened to the desired degree of engagement so the joints of the arms may be separately moved to any position and frictionally retained in such position.

Still another object of the invention is to provide a mounting clamp for a mirror which is generally of a C-clamp construction and which may be used on furniture without injuring the surface thereof.

A still further object of the invention is to provide a mirror which is detachably connected by a swivel joint member to a mounting arm so that the hingeable arms may be folded in side by side relation so the mirror and the mounting clamp may be put in separate packing compartments.

Another object of the invention is to provide a portable mirror, which is easy to assemble, to attach, to use and to disassemble without the use of tools.

SUMMARY OF THE INVENTION

This invention relates to mirrors preferably for use by travelers, also to a mirror having a mounting clamp so that the mirror may be mounted on various ledges, posts, chair arms, chests of drawers, and the like, regardless of the angle. The mirror may be pivotally mounted on the clamp on various portions thereof so it will swing in a 360° arc and which mirror has arms or bars that are jointed with friction type joints that normally maintain the position to which they are moved each which joints will move approximately 180° and with a mirror mounted on the outer most arm of a ball and socket, the mirror may be revolved 360° about any of several axes so that by the manipulation of the jointed arms, the mirror may be used by the person whether sitting or standing or lying down (with a simple manipulation of the jointed arms) once the pivoted mirror clamp is installed on a suitable ledge, whether vertical, horizontal, whether above or below the ledge or installed on an upright member such as a chair leg or horizontal member such as a chair arm, complete universal flexibility of the unit is had.

The unit is demountable in that the mirror may be threadably attached to threaded coupling on an arm and the opposite end of another arm is pivotally and detachedly connected to a mounting clamp so the unit may be disassembled into three parts to enable the disassembled parts to be encased within a suitable case or pouch so it may be readily packed within luggage for transportation from place to place.

BRIEF DESCRIPTION OF THE DRAWINGS

With these objects in mind and others that will become manifest as the description proceeds, reference is had to the accompanying drawings in which like reference characters designate like parts in the several views thereof, in which:

FIG. 1 is a fragmentary perspective view of the mirror support clamp secured to a horizontal ledge by means of a thumb screw, in an upright position, showing a stub shaft pivotally mounted in a socket in the upper end of the thumb screw thereof with portions of the arms being broken away and portions shortened and with portions being shown in sections with a fragmentary portion of the mirror which joint is shown positioned on the outer most end of the outer most joint of the arm being shown in dashed outline;

FIG. 2 is a fragmentary, exploded, perspective view of a portion of the mirror and a screw clamp member for attaching to the mirror;

FIG. 3 is a fragmentary elevational view, partly in section, and with parts broken away and parts shown in dashed outline to show the mounting clamp attached beneath a vertical ledge and showing the stub shaft on the lower arm portion seated in journaled relation within a pivot socket in the mounting clamp, the arm is shown in dashed outline in an alternate position, the vertical ledge is also shown in dashed outline;

FIG. 4 is a view similar to FIG. 3, but showing the mounting clamp attached to the upper side of a vertical ledge, such as an open drawer, the vertical ledge being shown in dashed outline;

FIG. 5 is a fragmentary perspective view showing the mirror clamp attached to a vertical member, such as an open door, the vertical member being shown in dashed outline;

FIG. 6 is an elevational view of the mirror mounting clamp mounted on a ledge, such as a table top, showing the arm portions thereof adjusted in an angular position, with a ball and socket joint mounting a mirror on the upper end of the upper arm portion, with the mirror being shown in perspective;

FIG. 7 is a side elevational view of the lower end of the lower arm portion, showing a stub shaft thereof for interengagement with one of the sockets in the mirror mounting clamp;

FIG. 8 is an elevational view of the mirror mounting clamp attached to the lower side of a vertical ledge, such as a table, with a portion of the table being broken away, and showing the mirror, in perspective, on the mounting arm;

FIG. 9 is a perspective view of the clamp attached to an upright member, such as the leg of a chair or table, and showing the lower end of the lower arm portion pivotally mounted in a hole formed in the side of the clamp to allow the arm to rotate about a vertical axis, the mirror being shown in perspective with a portion thereof being broken away;

FIG. 10 is a perspective view of the mirror mounting clamp mounted on a vertical ledge, such as the front of a door, and clamped thereon, showing the lower end of the lower arm portion pivotly connected to the upper side of the clamp for journal movement therein, and showing the outwardly extending arm portions mounting the mirror in a angular position for viewing.

DESCRIPTION OF THE PREFERRED EMBODIMENT

With more detailed description of the invention, the mounting clamp generally designated with the numeral 1 is a C-clamp having a body member 2 substantially in the shape of a C with a throat 4 to receive a member such as a ledge 6 which may be the horizontal extension of a table with a base portion 8 extending beneath the ledge 6 and with the body member 2 extending outwardly above the horizontal ledge as indicated at 10 which outward extending portion is apertured as indicated at 12 and the extending portion 10 is threaded to receive a screw 14 therethrough which has a freely rotatable foot 16 thereon and a knurled thumb wheel 18 on the upper end thereof. The upper side of the thumb screw wheel 18 has a socket 20 therein to receive a stub shaft 22 on the lower end portion 24 of the lower arm portion or shaft 26 which arm has a bearing member 28 that is held in frictional engagement between the sides 30 of the lower end of the lower arm bearing adjusting screw and locking arrangements 32 and 34 respectively are provided to frictionally engage the sides 30 of the lower end of the lower arm portion or shaft with the bearing member 28 in such a manner that the joint will be held in adjusted fixed relation until manually moved. The screw 14 has a socket 20 formed in the upper end thereof to receive the stub shaft 22, on which stub shaft 22 is mounted an hingeable joint comprising a bearing member 28 and side plates 30, which side plates frictionally engage bearing member 28 and extend upward to form a socket 39, within which socket an arm portion or shaft 26 is fitted, which shaft may be readily inserted into the socket and removed therefrom. This arrangement facilitates the assembly and disassembly of the unit. The upper end of the lower arm portion or shaft 26 has similar side plates 30 thereon which bindingly engage the bearing 28 positioned between the side plates 30 and which are held in adjusted relation by screw and lock members 32 and 34 respectively which allows the joint to be manually moved and will retain this position until manually moved to another position.

An arm portion 36 is secured within a socket 38 of bearing 28 at it's lower end and extends upward and is secured within socket 40 of a ball and socket arrangement, which arrangement has a ball 42 therein which is attached to screw threaded member 44 that threadably engages in a threaded hole 47 in frame 46 of mirror 48.

The screw threaded member 44 readily disengages from the frame 46 of the mirror without tools. The mounting clamp, generally designated by the numeral 1, has a socket 50 in the side thereof which is at a right angle to socket 20 in the thumb screw wheel 18 which enables the mounting clamp 1 to be clamped to the bottom of a vertical ledge 6A, so the socket 50 will extend upward therefrom. When the stub shaft 22 is rotatably fitted within the socket, the arm 26 will swing through a 360° arc to position the mirror 48 in the desired position, as will best be seen in FIG. 3.

The mounting bracket 1 has a socket 52 therein, the axis of which socket is parallel to the axis of socket 50, but is on the opposite side of the mounting clamp 1, thereby enabling the mounting C-clamp 1 to be used on an upstanding vertical ledge 6B, as will best be seen in FIG. 4, with the arm portion 26 and mirror 48 being in position to rotate about an axis of 360°. The mounting clamp 1, as shown in FIG. 5, has a socket 54 extending transversely thereinto at a right angle to the axes of socket 20 and 50 thereby enabling the mounting C-clamp 1 to be secured to an upright vertical member 6C so that the arm 26 may revolve 360° around the axis of stub shaft 22, to enable bringing the mirror into a desired position as will also be seen in FIG. 9. The mounting clamp when in this position may be clamped to a vertical member, such as a leg of a chair or table as indicated in 6D. When desired, the clamp may be reversed from positions shown in FIGS. 5 and 9, and the stub shaft 22 inserted into another of the sockets 52 so as to give complete universal movement of the clamp to any position, so long as the ledge clamped is within the limit of the opening of the C-clamp to receive a member between the rotatable foot 16 and the outward extending base portion 8 of the mounting clamp. FIGS. 6 through 10 show various positions in which the mirror may be used when mounted on horizontal or vertical ledges such as tables, chair legs, drawer tops or skirts beneath a dresser or the like.

While the mirror is shown to be round, it is to be understood that a polygonal shaped mirror is readily adaptable for use on the screw threaded member 44 and is within the scope and intent of the invention.

Having thus described my invention, I claim:

1. A universally movable, demountable mirror comprising;
    a. a C-clamp
        1. said C-clamp having two sockets formed therein with the axes thereof being parallel, which sockets are positioned in opposed relation on said C-clamp to receive a stub shaft therein,
        2. said C-clamp having an opening formed therein which opening passes transversely therethrough at a right angle to the axes of said sockets, which opening is adapted to receive a stub shaft in either end thereof,
        3. an outwardly extending portion of said C-clamp being screw threaded,
        4. a screw threadably engaging said screw threaded portion of said C-clamp,
        5. A thumb wheel on an end of said screw,
        6. said thumb wheel having a socket formed therein to receive a stub shaft,
        7. an opposing portion of said C-clamp, opposite the end of said screw remote from said thumb wheel forms a clamping base portion.
    b. a bearing member forming a first hingeable member,
        1. a stub shaft on said bearing member of said first hingeable member, which stub shaft is of a size to be received in the sockets of said C-clamp and the socket of said thumb wheel in close fitting relation,
c. a first arm,
 1. side plates on an end of said first arm and being engageable with said bearing member in complementary friction relation,
d. screw and lock means positioned on said side plates to bindingly engage said side plates with said bearing member to retain said first arm in adjusted relation with respect to said bearing member,
e. a second arm having a similar bearing member thereon and similar side plates,
 1. said first arm and said second arm lying in the same plane,
f. a mirror universally mounted on said second arm remote from said stub shaft, for movement to a selected position.

2. A universally movable, demountable mirror as defined in claim 1; wherein
 a. each hinge formed by each said bearing and said complementary side plates being adapted to hinge through at least 180 degrees in the same plane.

3. A universally movable, demountable mirror as defined in claim 1; wherein
 a. each said socket formed in said C-clamp being at a right angle to the opening formed in said C-clamp and to the socket formed in the thumb wheel.

4. A universally movable, demountable mirror as defined in claim 1; wherein
 a. said stub shaft on said bearing member is adapted to rotate 360°, when fitted in each of the sockets and to rotate 360° when fitted in each end of said opening passing transversely through the body of said C-clamp.

* * * * *